US012371928B2

(12) United States Patent
Everett

(10) Patent No.: US 12,371,928 B2
(45) Date of Patent: Jul. 29, 2025

(54) LOCK FOR SLIDING CLOSURE

(71) Applicant: KDB INTELLECTUAL PTY LTD, Queanbeyan East (AU)

(72) Inventor: Tim Everett, Queanbeyan (AU)

(73) Assignee: KDB INTELLECTUAL PTY LTD, Queanbeyan East (AU)

( * ) Notice: Subject to any disclaimer, the term of this patent is extended or adjusted under 35 U.S.C. 154(b) by 180 days.

(21) Appl. No.: 17/431,349

(22) PCT Filed: Feb. 14, 2020

(86) PCT No.: PCT/AU2020/000015
§ 371 (c)(1),
(2) Date: Aug. 16, 2021

(87) PCT Pub. No.: WO2020/163896
PCT Pub. Date: Aug. 20, 2020

(65) Prior Publication Data

US 2022/0136287 A1 May 5, 2022

(30) Foreign Application Priority Data

Feb. 15, 2019 (AU) ................................ 2019900492

(51) Int. Cl.
*E05B 65/08* (2006.01)
*E05B 15/10* (2006.01)
(Continued)

(52) U.S. Cl.
CPC ........ *E05B 65/0864* (2013.01); *E05B 15/101* (2013.01); *E05B 63/0017* (2013.01);
(Continued)

(58) Field of Classification Search
CPC ............... E05B 65/0864; E05B 15/101; E05B 63/0017; E05B 63/127; E05B 65/08;
(Continued)

(56) References Cited

U.S. PATENT DOCUMENTS 308,768 A * 12/1884 Hazen ........................ E05C 3/34
292/DIG. 19
573,934 A * 12/1896 Trepte ................... E05B 63/126
292/DIG. 37
(Continued)

FOREIGN PATENT DOCUMENTS

EP 0722156 B1 3/1999
WO 2011083430 A1 7/2011

OTHER PUBLICATIONS

International Search Report and Written Opinion from PCT International Application No. PCT/AU2020/000015, dated Apr. 6, 2020.
(Continued)

*Primary Examiner* — Christine M Mills
*Assistant Examiner* — Faria F Ahmad
(74) *Attorney, Agent, or Firm* — Budzyn IP Law, LLC

(57) ABSTRACT

A locking apparatus for a sliding closure slidable within a frame is disclosed. The locking apparatus comprises at least one locking tang movable transversely to the closure plane, between a locking position and a release position wherein, when in the locking position the locking tang extends laterally, in a direction transverse to the closure lane, beyond the closure to be received within a corresponding locking recess in the frame, such that the locking tangs resist opening of the closure, and when in the release position the locking tang is withdrawn within the dimensions of the frame, such that the closure may be opened or closed. The locking mechanism may also comprise a sensor configured to detect when at least one of the locking tangs are in the locked or released position, and, optionally to trigger an alarm if the locking tang is disengaged.

20 Claims, 18 Drawing Sheets

(51) Int. Cl.
*E05B 63/00* (2006.01)
*E05C 1/00* (2006.01)
*E05C 9/04* (2006.01)
*E05C 9/18* (2006.01)

(52) U.S. Cl.
CPC .............. *E05C 1/002* (2013.01); *E05C 9/045* (2013.01); *E05C 9/1841* (2013.01)

(58) Field of Classification Search
CPC ...... E05B 65/087; E05B 63/12; E05B 63/122; E05B 63/126; E05C 1/002; E05C 9/045; E05C 9/1841; E05C 1/004; E05C 1/006; E05C 9/1825; E05C 9/1833; Y10T 70/5327; Y10T 292/084; Y10T 292/0976; Y10S 292/46
See application file for complete search history.

(56) References Cited

U.S. PATENT DOCUMENTS

| | | | | | |
|---|---|---|---|---|---|
| 895,837 | A | | 8/1908 | Blair | |
| 1,083,173 | A | * | 12/1913 | Zeckhauser | E05B 65/0007 292/139 |
| 1,264,814 | A | * | 4/1918 | Kornstein | E05B 63/126 70/136 |
| 1,673,468 | A | * | 6/1928 | Palinkas | E05B 63/126 70/120 |
| 2,253,496 | A | * | 8/1941 | Cordrey | E05B 65/087 292/182 |
| 2,668,073 | A | * | 4/1954 | Collar | E05B 63/127 292/192 |
| 2,720,774 | A | * | 10/1955 | Gehrie | E05B 65/5261 70/123 |
| 3,175,376 | A | * | 3/1965 | Cantwell | E05B 17/042 70/145 |
| 3,582,119 | A | * | 6/1971 | Woodworth | E05B 63/127 292/29 |
| 4,566,725 | A | * | 1/1986 | Klein | E05B 63/127 292/191 |
| 4,615,550 | A | * | 10/1986 | Abate | E05B 63/127 292/192 |
| 5,009,089 | A | * | 4/1991 | Lin | E05B 63/126 292/49 |
| 5,516,162 | A | * | 5/1996 | Takaishi | E05B 65/0858 292/37 |
| 7,036,851 | B2 | * | 5/2006 | Romig | E05B 65/0858 292/96 |
| 7,836,737 | B2 | * | 11/2010 | Lin | E05B 65/0858 292/159 |
| 10,662,676 | B1 | * | 5/2020 | Monroe | E05B 81/14 |
| 10,837,201 | B2 | * | 11/2020 | Nicoara | E05B 63/127 |
| 11,377,874 | B2 | * | 7/2022 | Cheng | E05B 17/2003 |
| 2016/0208526 | A1 | | 7/2016 | Cheng | |

OTHER PUBLICATIONS

Examination Report from Australian Application No. 2020203262, dated Jul. 3, 2021.

* cited by examiner

LOCK FOR SLIDING CLOSURE

CROSS-REFERENCE TO RELATED APPLICATION

This Application is a National Stage Application under 35 U.S.C. § 371 of PCT Application No. PCT/AU2020/000015, filed Feb. 14, 2020, the entire contents of which are incorporated by reference herein.

FIELD OF THE INVENTION

The present invention relates to a lock arrangement for securing a slidable closure. The present invention has particular application to sliding doors, and will be described with particular reference to this application. However, the invention can be used with other types of sliding closure.

BACKGROUND TO THE INVENTION

Closures, such as windows or doors, are often used to close off areas for convenience or security purposes. When security is an issue, locks are required to secure the closures in position. Security doors, for example, are specially designed to secure an area and are often used on emergency exit routes.

Different types of closures are used in different circumstances—for example, some closures are mounted to a door frame by hinges, while others are slidably mounted within a frame (e.g. with sliding tracks at the top and bottom, or on the left or right sides of the closure).

For sliding closures, locks are required to hold the closure in the closed position and prevent it from being withdrawn in a sliding manner to open the door. Different types of locks can be used, such as a latch-type lock, and deadlock, and possibly other locks in special circumstances. For any lock, it is important that the lock strongly secures the closure in position (to resist malicious attempts to open the closure). For high security applications, conventional locks may not engage sufficiently strongly to prevent opening of the closure against malicious attacks. This can be a particular problem with sliding doors, which struggle to meet higher security industry standards in areas such as pull tests. It would be desirable to provide a lock for a sliding door which provides a stronger engagement than in conventional locks.

It is a preferred object of embodiments of the present invention to address or at least ameliorate one or more of the aforementioned problems of the prior art and/or provide a useful commercial alternative.

The reference to any prior art in this specification is not, and should not be taken as, an acknowledgement or any form of suggestion that the prior art forms part of the common general knowledge.

SUMMARY OF THE INVENTION

In one form, although it need not be the only or indeed the broadest form, the invention resides in a locking apparatus for a sliding closure slidable within a frame defining a closure plane, the locking apparatus comprising: at least one locking tang movable transversely to the closure plane, between: a locking position where the locking tang extends laterally, in a direction transverse to the closure plane, beyond the closure to be received within a corresponding locking recess in the frame, such that the locking tang resists opening of the closure; and a release position where the locking tang is withdrawn within the dimensions of the frame, such that the closure may be opened or closed.

The locking apparatus may comprise two locking tangs which extend laterally on opposite sides of the closure plane when in their respective locking positions, to be received within corresponding locking recesses in opposite sides of the frame.

The present invention has advantages over conventional locking arrangements for sliding closures, in that the transverse extension of the locking tangs may provide a stronger engagement with the frame, and therefore a more secure locking position. The locking tangs are received into locking recesses on one or both sides of the frame—preferably, the locking recesses are located in respective box keeps installed on opposite sides of a channel of the frame, which receives the edge of the closure.

The locking apparatus may further comprise one or more actuating tangs. The actuating tang(s) may be extendible longitudinally from the closure (in the direction of sliding of the closure), to move each locking tang into its locking position.

The one or more actuating tangs may be spring biased.

Alternatively, the one or more actuating tang may be connected to locking tangs via mechanical linkage. The one or more actuating tangs may be biased to their release position by the mechanical linkage. The mechanical linkage may comprise a pair of arms disposed at an angle to each other and connected at a pivot point. The mechanical linkage may be capable of engaging with the locking tangs to translate the longitudinal movement of the actuating tang, into lateral movement of the locking tangs.

The one or more actuating tangs may only be movable by key activation or turn snib activation (e.g. in the case of a deadlock). One actuating tang may drive movement of multiple locking tangs.

One or each locking tang may comprise a cam surface, whereby extension of the one or more actuating tangs pushes on said cam surface to move the respective locking tang laterally. In some embodiments, an intermediate piece may be provided with a cam surface, to translate longitudinal movement of the one or more actuating tangs into lateral movement of the at least one locking tang(s). The actuating tang may also comprise one or more mating cam surfaces (angled obliquely to its direction of sliding).

The at least one locking tang may be biased to its release position (e.g. by a spring or a mechanical linkage), and/or may be pushed to its release position by the frame, as the closure is slid to a closed position (external cam surfaces may be provided on the locking tang(s) to engage the frame and push the locking tangs to their release position).

The actuating tang may be lockable in an extended position. The actuating tang may be extendable and retractable by operation of a key, and/or may be biased (e.g. by a spring or a mechanical linkage) to its extended position. For a deadlock, the actuating tang may only be extendable and retractable by key activation or turn snib activation.

The locking apparatus may further comprise one or more respective box keeps installed within the frame, to provide the locking recess(es) for the at least one locking tang.

In a second aspect of the invention, there is provided a locking apparatus for a sliding closure slidable within a frame, the locking apparatus comprising: a first lock according to the first aspect of the invention, being a deadlock; and a second lock according to the first aspect of the invention, being a latch lock such as a mortice lock.

In some embodiments of the second aspect, key activation to unlock the first lock may be independent from key activation of the second lock.

In embodiments in which key activation or turn snib activation to unlock the first lock is independent from key activation of the second lock, the key for the first lock may be different to the key for the second lock.

Alternatively, the key for the first lock may be the same as the key for the second lock.

In other embodiments of the second aspect, key activation to unlock the first lock may also unlock the second lock.

Alternatively, the first lock and the second lock may be mechanically linked whereby key activation to unlock the first lock also unlocks the second lock.

Either or both locks may be activated by key activation, turn snib activation, or electronic activation.

In one embodiment of the first or second aspect, the locking apparatus comprises a sensor configured to detect when at least one locking tang is in the locked or released position. The sensor may comprise one or more electronic signaller such as a micro switch and/or a printed circuit board (PCB). The sensor may be operatively connected to send a signal to communicate that at least one of the locking tangs is in the locked or released position. The signal may be communicated via a continuous cable. The signal may be communicated to a guardhouse and/or offsite or remote location to communicate that at least one of the locking tangs is in the locked or released position. The sensor may also be able to trigger an alarm when at least one of the locking tangs is disengaged. The alarm may be located in the guardhouse or offsite location.

In a further aspect of the invention, there is provided a closure assembly comprising: a frame defining an opening and a closure plane; a closure slidable within the frame to open or close the opening; and locking apparatus according to the first, or second aspect of the invention. In this specification, unless stated otherwise, the term 'laterally' is used to refer to a direction transverse to the plane of the closure (and the direction of sliding). 'Longitudinally' is used to refer to the direction of sliding of the closure.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
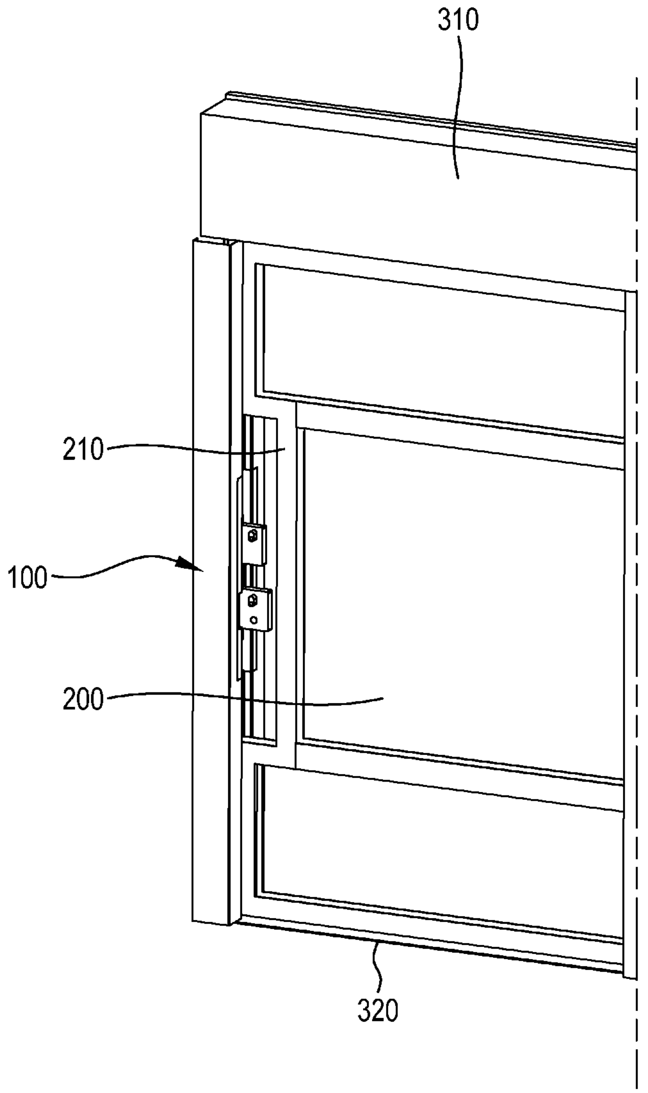
FIG. 1 is a front perspective view of a closure mounted with a multi-lock locking apparatus according to an embodiment of the invention.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

DETAILED DESCRIPTION OF THE INVENTION

Referring to the figures, there is shown a multi-lock locking apparatus 100 according to an embodiment of the invention, mountable on a closure 200 in the form of a sliding door or window, which slides within a frame 300.

Referring to FIG. 1, the closure 200 is horizontally slidable between an upper mounting track 310 and a lower mounting track 320 of the frame 300. The closure 200 can be slid towards and away from the side member 330 of the frame 300. When closed, the edge of the closure 200 is received within a channel 360 within the side member 330, which runs axially (i.e. vertically, in the case of a horizontally sliding door) along substantially the height of the side member 330.

The multi-lock locking apparatus 100 is mounted in a lock mounting section 210 towards an edge of the sliding closure 200 (towards the left edge as shown in FIG. 1). The locking apparatus 100 can selectively secure the edge of the closure to the side member 330 of the frame 300, to secure the closure 200 in a closed position.

Figure 2:
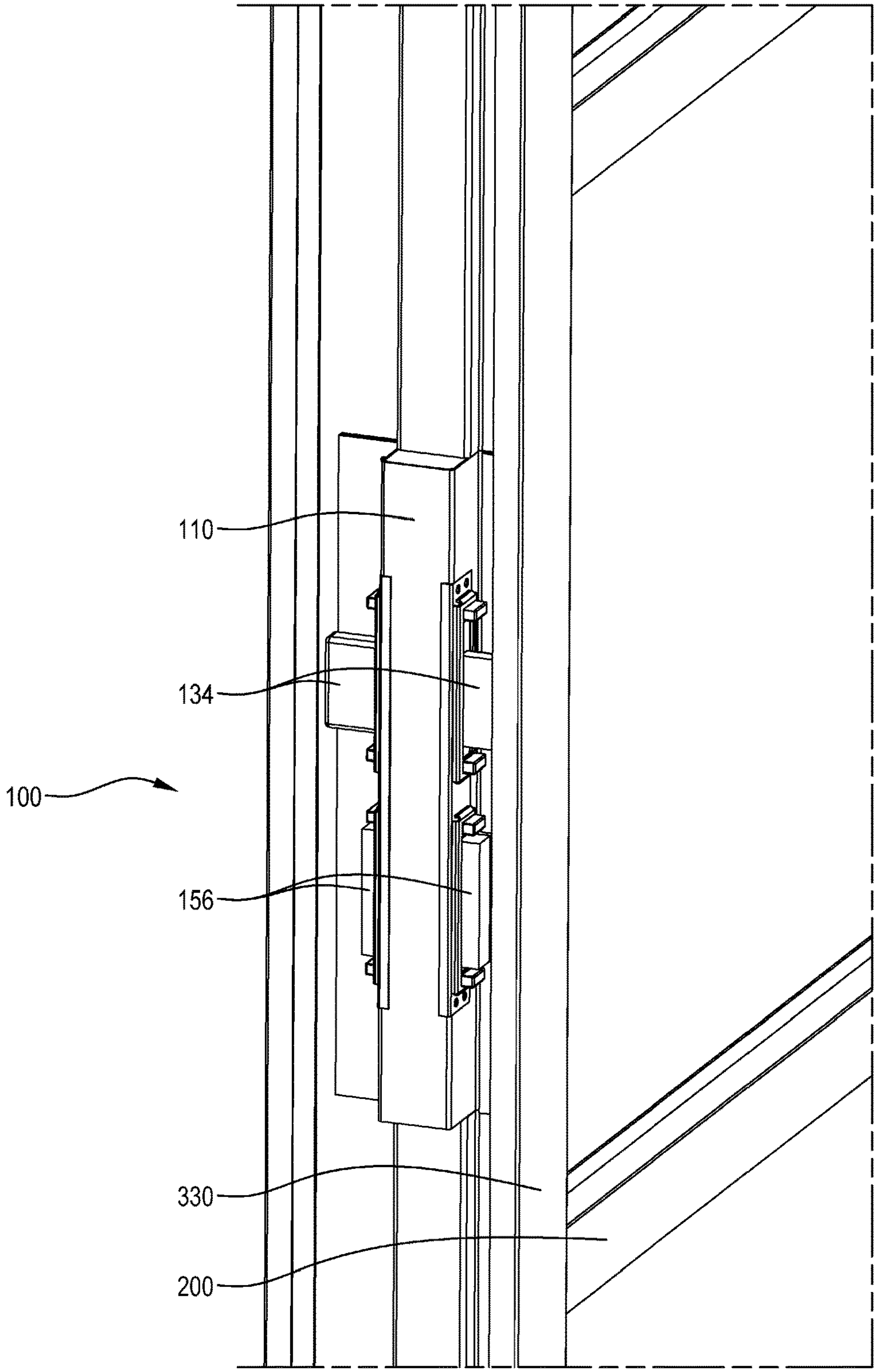
FIG. 2 is a perspective view of a multi-lock locking apparatus according to an embodiment of the present invention.

FIGS. 1 and 2 depict the closure 200 in a closed position, located within the channel 360 of the side frame member 330. However, in FIG. 2, it will be understood that the lock housing 110 obscures most of the internal workings of the multi-lock locking apparatus 100.

Figure 3:
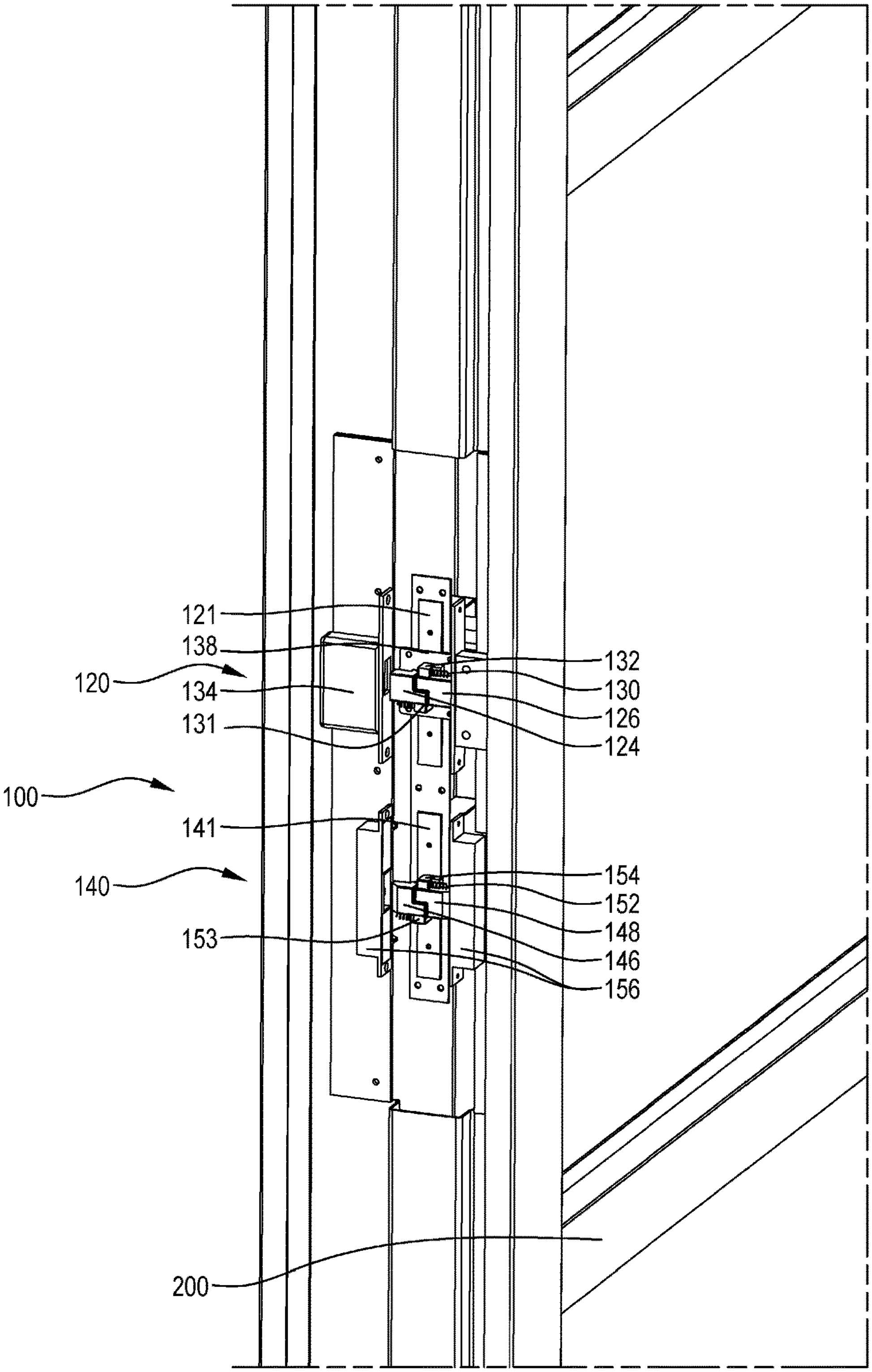
FIG. 3 is a perspective view of the locking apparatus of FIG. 2, with the housing cut away.
Figure 4:
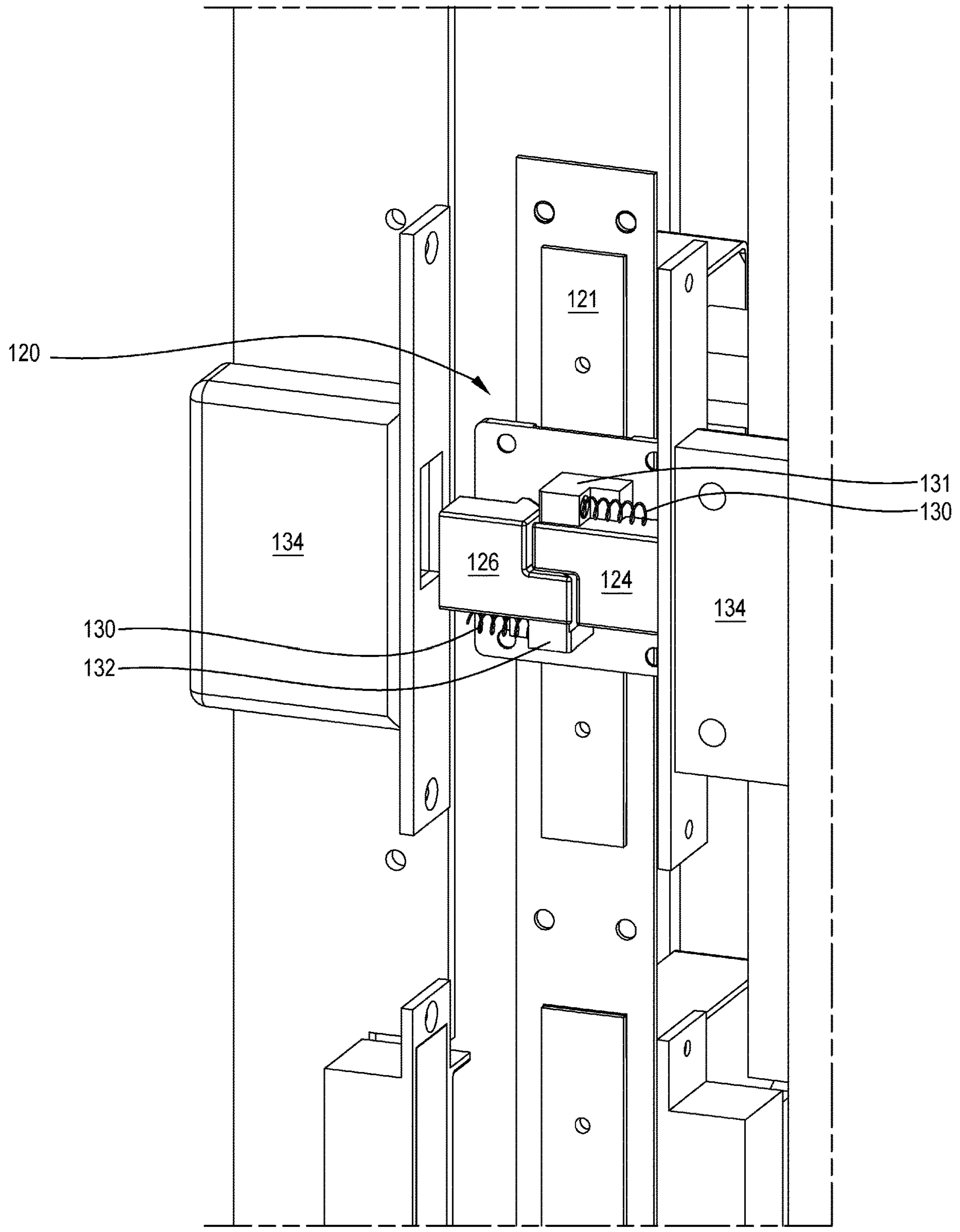
FIG. 4 is a perspective view of a first lock of the locking apparatus of FIG. 2, with the housing cut away.
Figure 5:
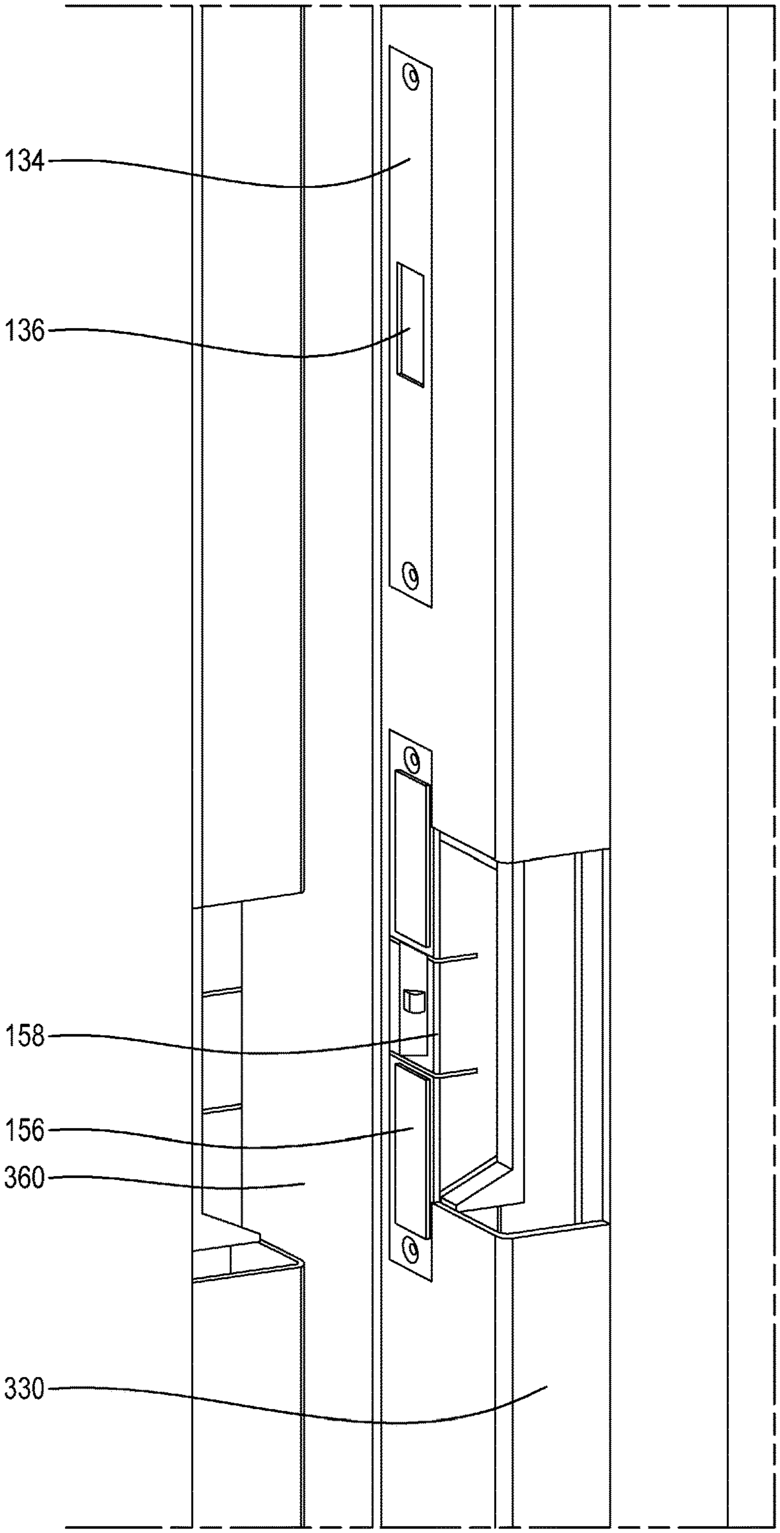
FIG. 5 is a perspective view of the locking area of the frame used with the locking apparatus of FIG. 2.

FIG. 3 depicts the multi-lock locking apparatus 100 in more detail, with the housing 110 not shown so that the internal components of the apparatus 100 can be better seen. The multi-lock locking apparatus 100 includes a first lock apparatus 120 and a second lock apparatus 140, which are each described in more detail below. Each of the first and second locking apparatus 120, 140 comprises an individual embodiment of the present invention; that is, although a multi-lock embodiment 100 with two types of locking arrangements is shown in FIGS. 1 to 5, some closures may include only one of the locking apparatus 120, 140.

Figure 6:
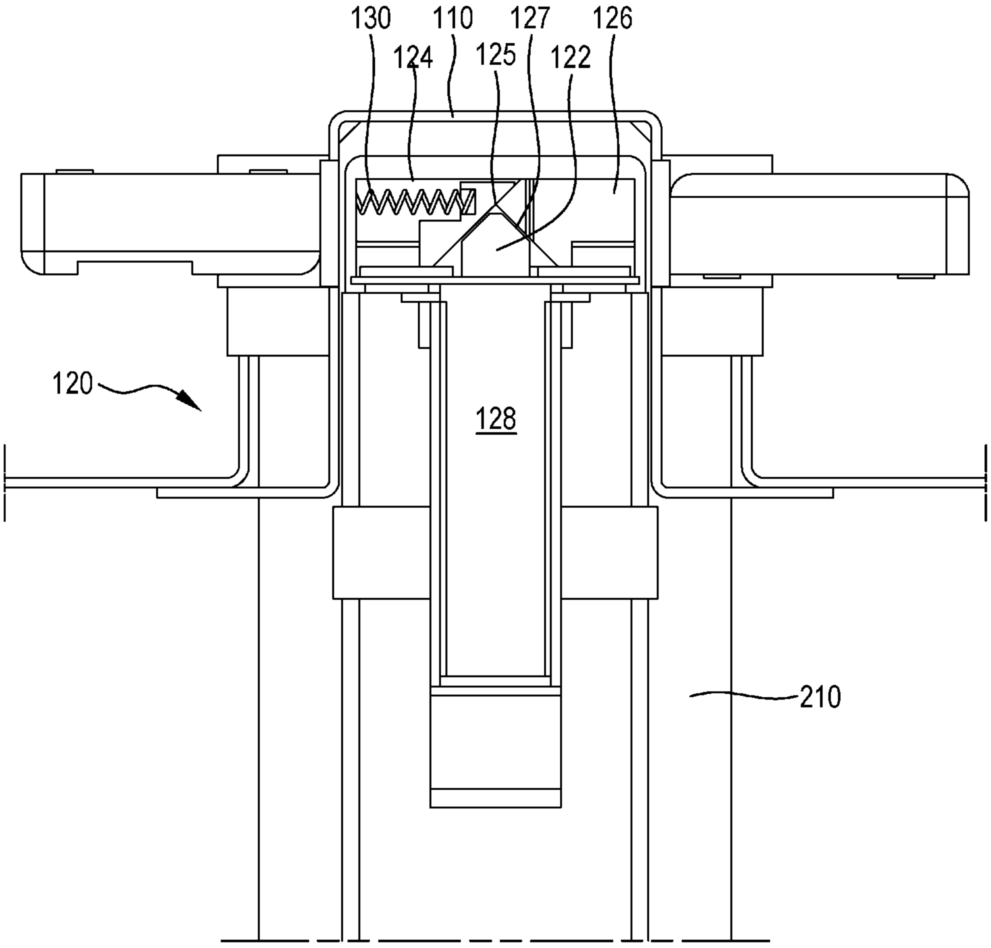
FIG. 6 is a top view of the components of the first lock of the locking apparatus of FIG. 2.
Figure 10:
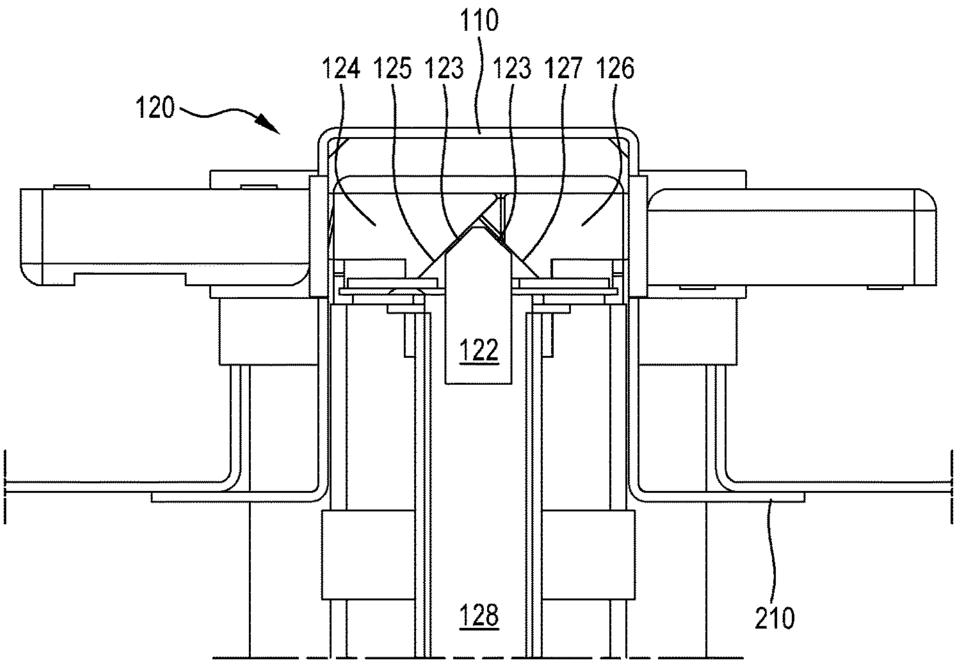
FIG. 10 is a top view of the components of the lock of FIG. 6, in a release position.
Figure 11:
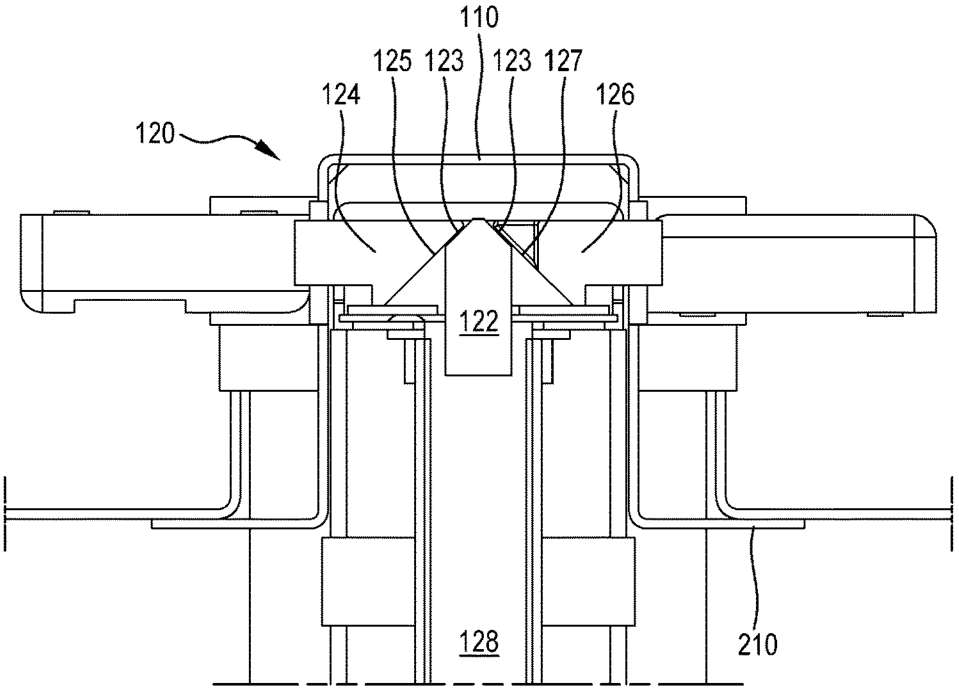
FIG. 11 is a top view of the components of the lock of FIG. 6, in a locking position.

The first locking apparatus 120 is a deadlock embodiment of the invention, and includes a lock body 121 mounted in the closure 200 and a pair of box keeps 134 installed on opposite sides of the side frame member 330. The lock body 121 includes an actuating tang 122 and a pair of locking tangs 124, 126 mounted via mounting plate 138. The actuating tang 122 is mounted to a tang mount 128 within lock mounting section 210 of closure 200. In operation, the actuating tang 122 can be retracted as shown in FIG. 6 and FIG. 10, or extended longitudinally out from the lock mounting section 210 (in the direction of sliding of the closure 200, when being closed) as shown in FIG. 11, to push the locking tangs 124, 126 between a locking position and a release position. The actuating tang 122 can be moved between the extended and retracted positions by means of a key or turn snib (not shown), or alternatively could be electronically controlled. In either case, the actuating tang 122 is held securely in its extended state, to hold the locking tangs 124, 126 in their respective locking positions.

Figure 6A:
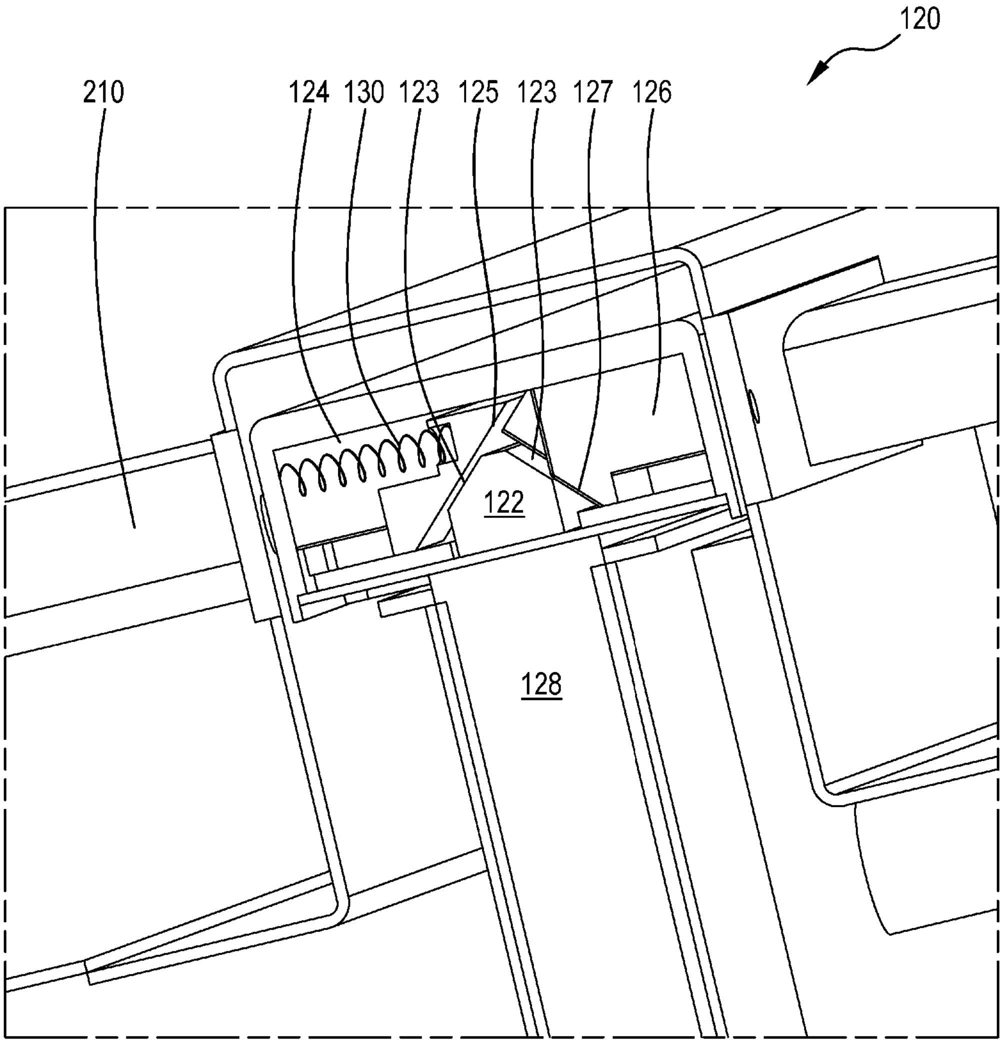
FIG. 6A is a perspective view of the components of the lock of FIG. 6.

The locking tangs 124, 126 are ordinarily biased by springs 130 (not shown in FIG. 10 or FIG. 11) into their release position, ensuring that when the actuating tang 122 is secured in the retracted position, the lock 120 allows movement of the closure 200. In their release position, as shown in FIG. 6, FIG. 6A and FIG. 10, the locking tangs 124, 126 are withdrawn within the dimensions of the frame 300. However, in their locking position, as shown in FIG. 11, the locking tangs 124, 126 extend laterally beyond the closure 200, and beyond the dimensions of lock body 121 mounted in the closure 200. Therefore, when the closure 200 is moved to a closed position (covering the opening defined by the frame 300), the locking tangs 124, 126 engage within a corresponding pair of locking recesses 136 located in box keeps 134 installed on either side of the side frame member 330.

As can be seen in FIG. 6, FIG. 6A, FIG. 10 and FIG. 11, the actuating tang 122 of the first lock 120 comprises a pair of cam surfaces 123. The cam surfaces 123 on the actuating tang 122 have complementary angles to cam surfaces 125, 127 on the locking tangs 124, 126. In operation, cam surfaces 123 matingly engage with the corresponding cam surfaces 125, 127 on the locking tangs 124, 126, and the angled surfaces act to translate longitudinal movement of actuating tang 122 into lateral movement of the locking tangs 124, 126. This allows extension of the actuating tang 122 (e.g. by key activation or turn snib activation) to drive movement of the locking tangs 124, 126 laterally (i.e. transversely to the plane of the closure) from their release position as shown in FIG. 6 and FIG. 10, to their locking position as shown in FIG. 11.

Figure 12:
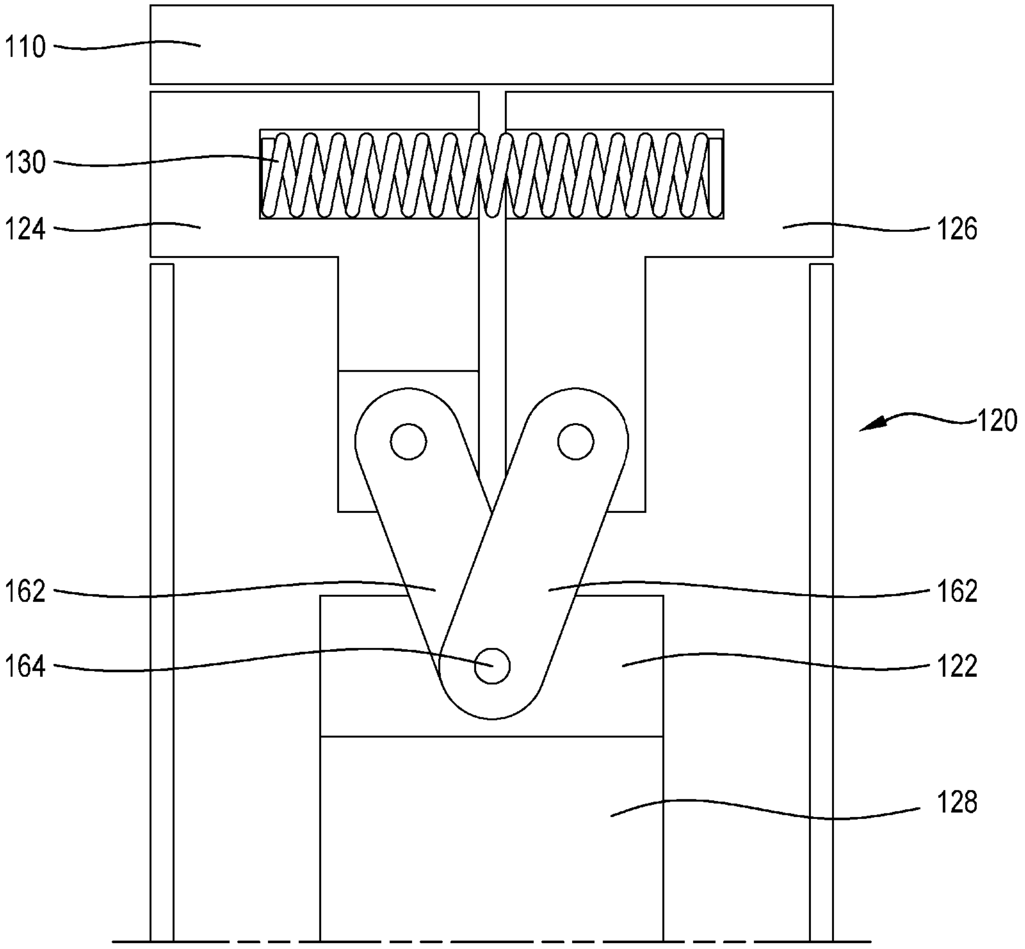
FIG. 12 is a top view of the components of another embodiment of a lock according to the invention.
Figure 13:
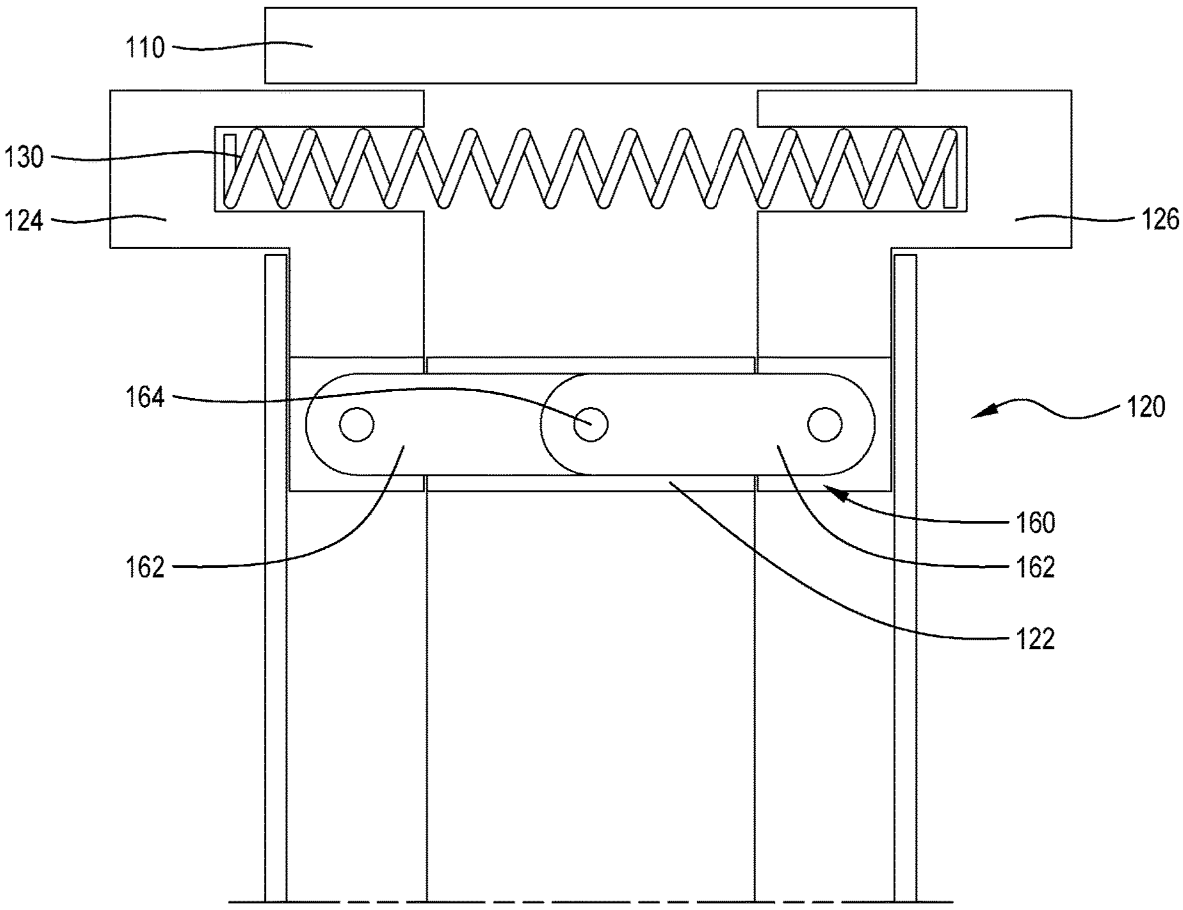
FIG. 13 is a top view of the components of the lock of FIG. 12, in a locking position.
Figure 14:
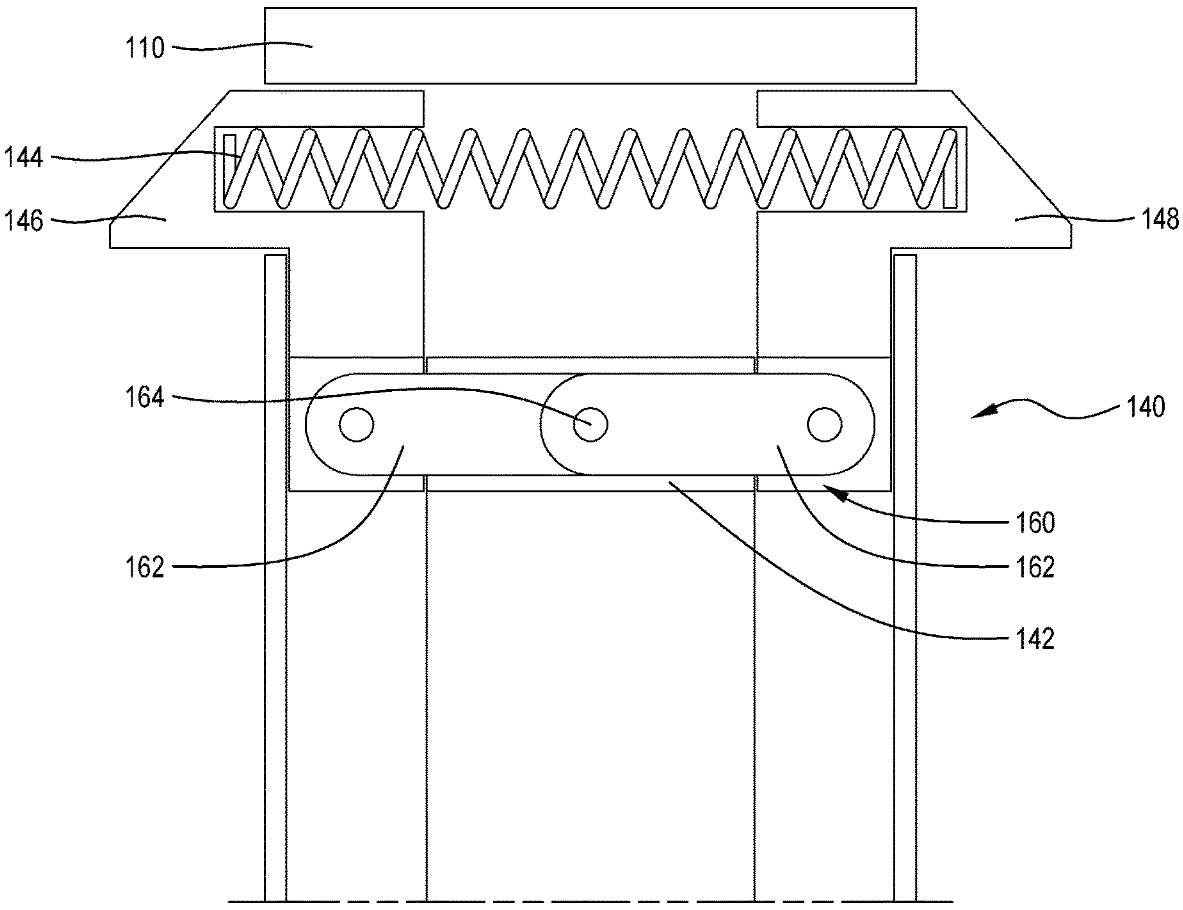
FIG. 14 is a top view of the components of another embodiment of a lock according to the invention.

In another embodiment of the first locking apparatus 120, as seen in FIG. 12, the locking tangs 124 and 126 may also be biased to their release position by mechanical linkage 160. In the embodiment shown, mechanical linkage comprises a pair of arms 162 disposed at an angle to each other and connected at a pivot point 164. Actuating tang 122 is connected to locking tangs 124 and 126 via mechanical linkage 160. In operation, when actuating tang 122 is moved, mechanical linkage 160 engages with locking tangs 124 and 126 to translate the longitudinal movement of actuating tang 122, into lateral movement of the locking tangs 124 and 126. This allows extension of the actuating tang 122 (e.g. by key activation or turn snib activation) to drive movement of the locking tangs 124, 126 laterally (i.e. transversely to the plane of the closure) from their release position as shown in FIG. 12, to their locking position as shown in FIG. 13.

Figure 16:
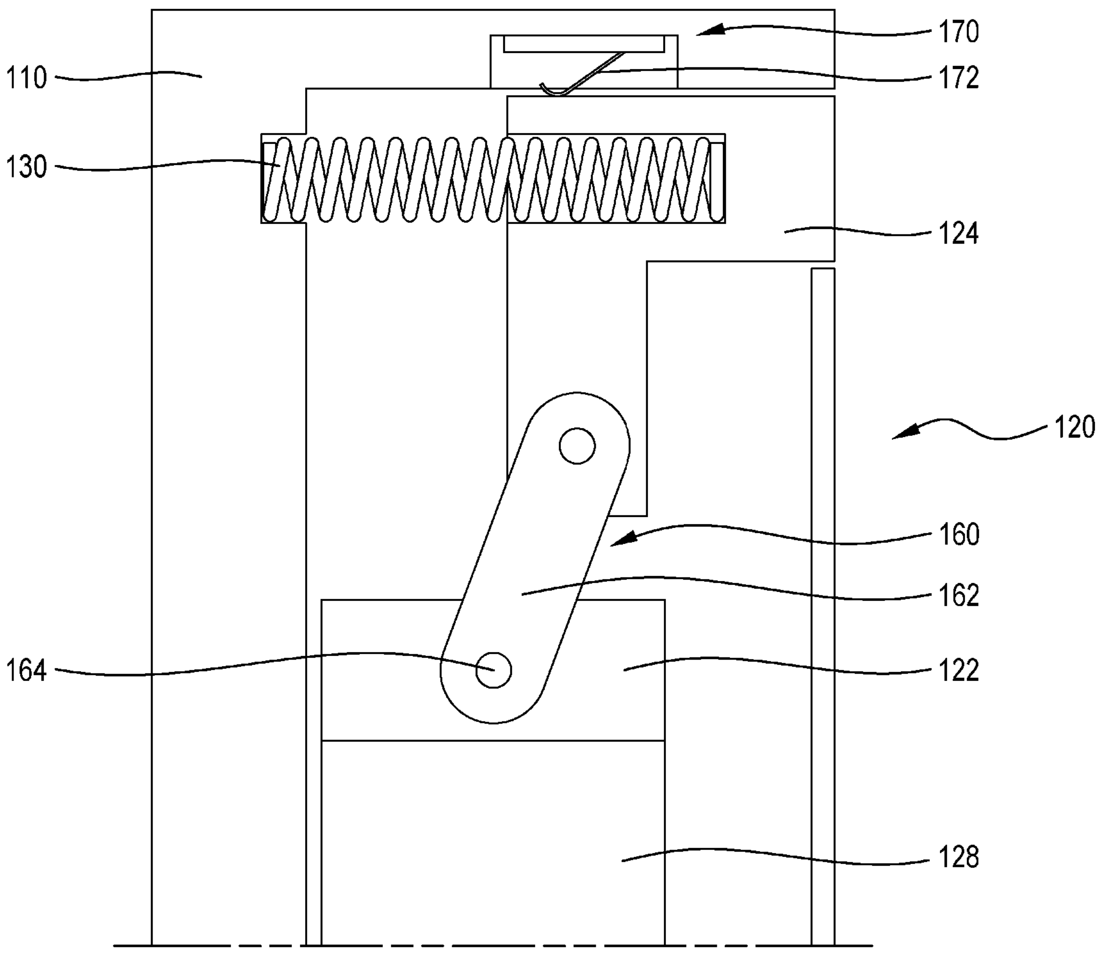
FIG. 16 is a top view of the components of another embodiment of a lock according to the invention.
Figure 17:
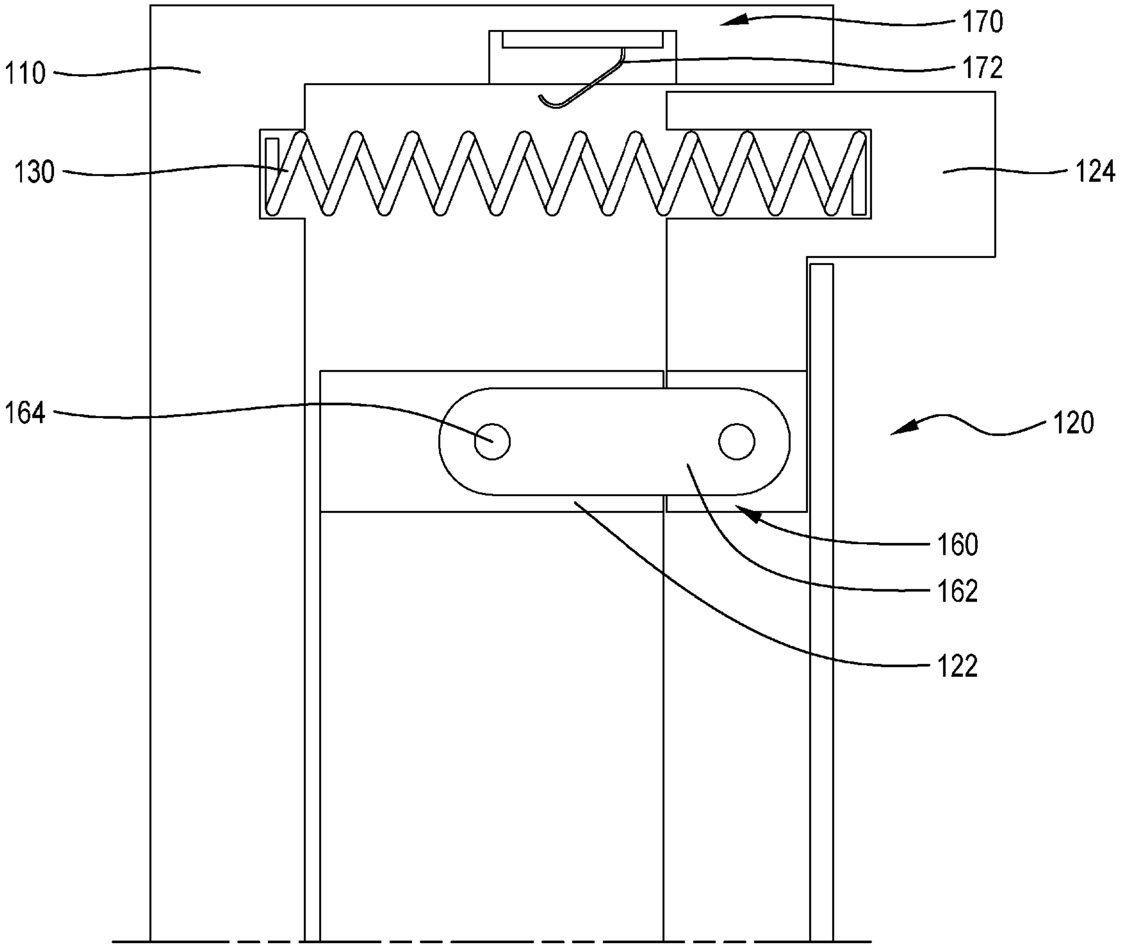
FIG. 17 is a top view of the components of the lock of FIG. 16, in a locking position.

As depicted in FIGS. 16 and 17, yet another embodiment of first locking apparatus 120 may feature a single locking tang 124. In this embodiment, only one locking recess 136 and box keep 134 need be installed in frame member 300.

Figure 7:
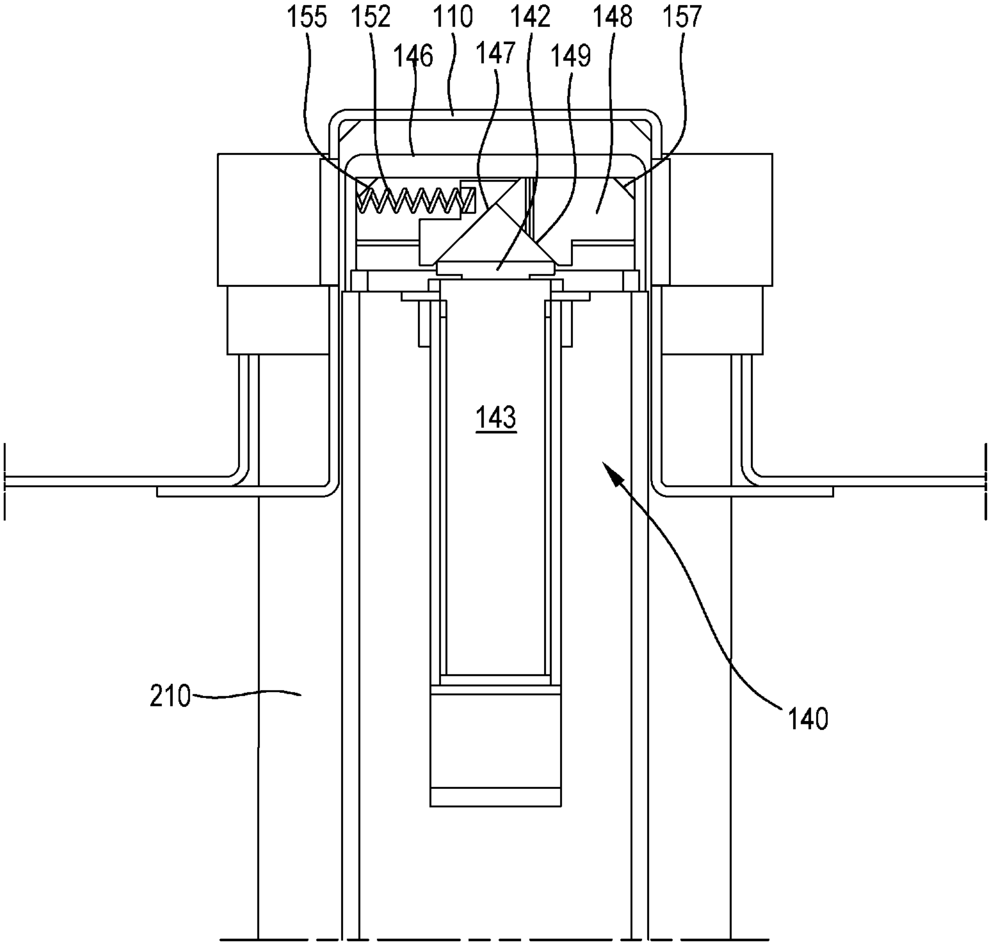
FIG. 7 is a top view of the components of the second lock of the locking apparatus of FIG. 2.
Figure 8:
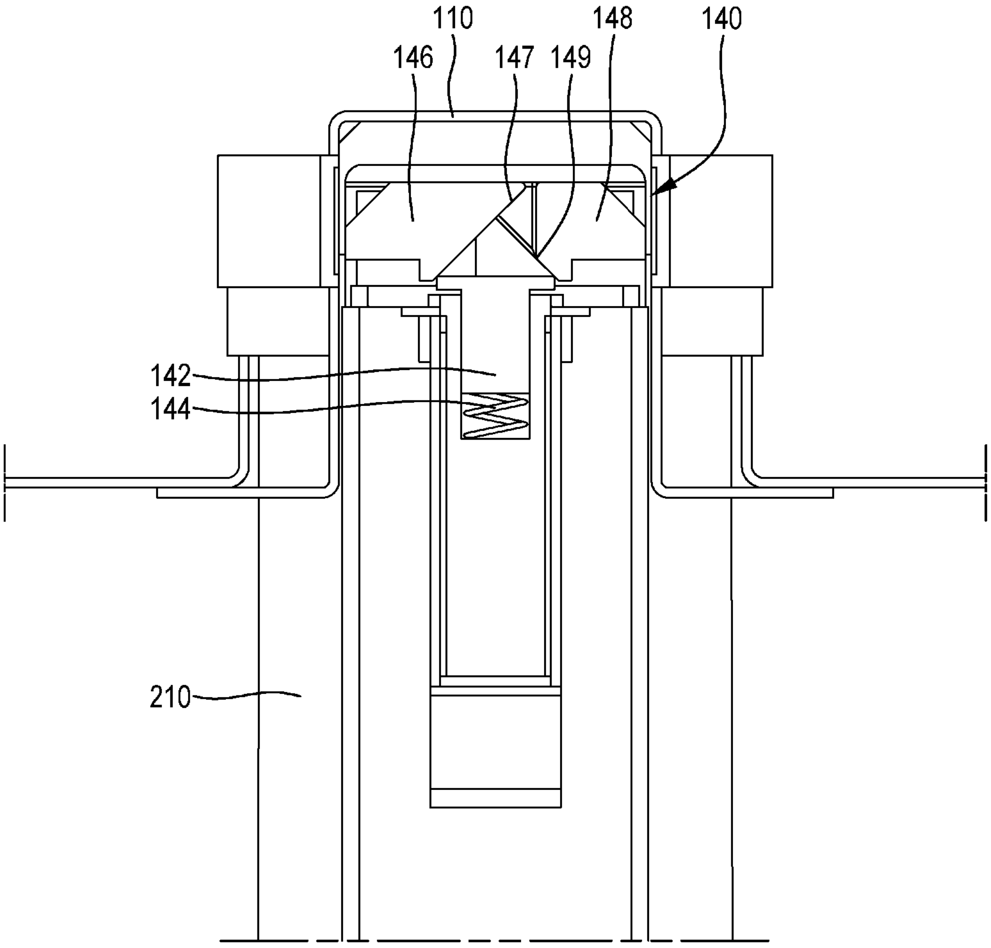
FIG. 8 is a top view of the components of the lock of FIG. 7, in a release position.
Figure 9:
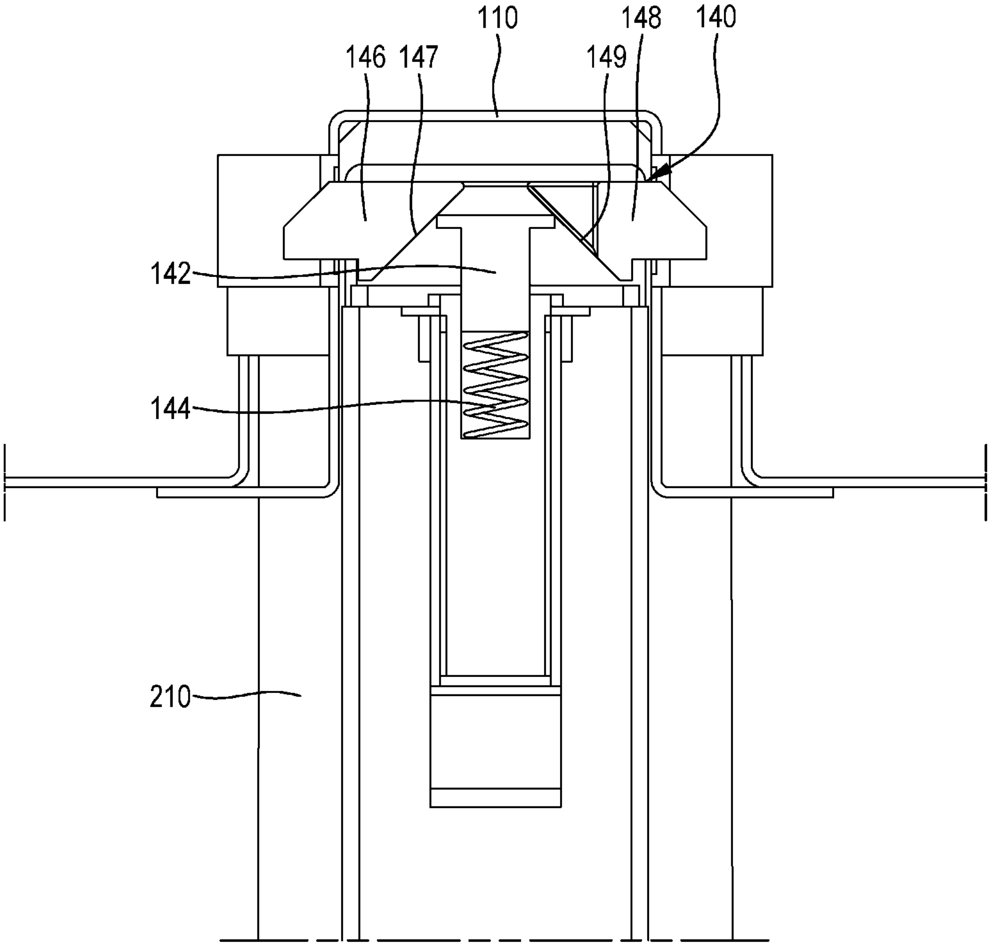
FIG. 9 is a top view of the components of the lock of FIG. 7, in a locking position.

The second locking apparatus 140, shown in more detail in FIGS. 7 to 9, is a mortice lock embodiment of the invention, and includes an actuating tang 142 which is mounted within a second tang mount 143 within the lock mounting section 210 of closure 200. Mortice lock 140 also includes a pair of locking tangs 146, 148, which selectively engage within recesses 158 of box keeps 156 installed in opposite sides of the channel 360 of side frame member 330.

Figure 7A:
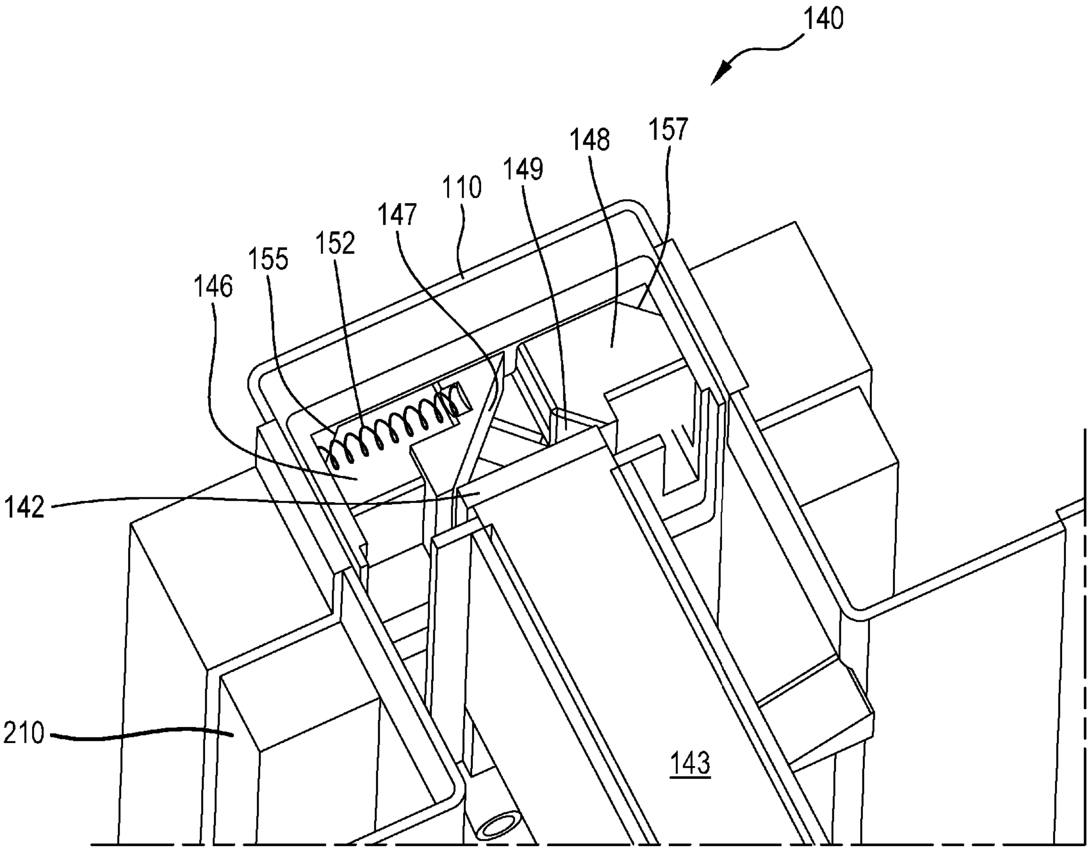
FIG. 7A is a perspective view of the components of FIG. 7.

The actuating tang 142 is biased outwardly by strong spring 144 (or actuating spring), to a longitudinally extended position as shown in FIG. 9. The actuating tang 142 may also be moved to a retracted position as shown in FIG. 7, FIG. 7A and FIG. 8.

In the extended position, the actuating tang 142 forces the locking tangs 146, 148 outwardly into a locking position. The second locking apparatus 140 is ordinarily biased into this position by strong spring 144, so that if the closure 200 is in a closed position, the locking tangs 146, 148 locate within respective locking recesses 158 on either side of the channel 360 of side frame member 330. In this position, the locking tangs 146, 148 hold the closure 200 firmly closed.

The strong spring 144 is sufficiently strong to overcome the resistance of biasing springs 152 (not shown in FIGS. 8 to 9), to drive the actuating tang 142 to its extended position in the absence of other forces acting on the tangs 142, 146, 148. The spring force of the two biasing springs 152 combined is less than the single strong spring 144. Accordingly, in the absence of other forces, the strong spring 144 acts to push the tangs 146, 148 out to their latched position. The locking tangs 146, 148 each include a cam surface 147, 149, which is angled diagonally relative to the direction of sliding of the closure 200. The actuating tang 142 is T-shaped as shown in FIGS. 7 to 9, with the projections of the "T" extending transversely to the closure plane. The transversely extending projections engage with the cam surfaces 147, 149 to translate the longitudinal movement of the actuating tang 142 into lateral (transverse) movement of the locking tangs 146, 148 into their respective locking positions.

The actuating tang 142 may be moved to its retracted position in multiple ways. It will be observed that locking tangs 146, 148 have external cam surfaces 155, 157, which can engage with the inward-facing edges of the respective box keeps 156, as the closure 200 is closed. The closing action of closure 200 results in the locking tangs 146, 148 being forced inwards to their release position, and simultaneously forces the actuating tang 142 to retract. When the closure 200 is closed sufficiently so that locking tangs 146, 148 align with recesses 158 in box keeps 156 mounted in opposite sides of the channel 360 of side frame member 330, the spring 144 acts to extend the actuating tang 142 out to its extended position. In turn, this forces the locking tangs 146, 148 into engagement within locking recesses 158, to secure the closure 200 in a closed position.

Alternatively, to release the closure 200, the actuating tang 142 may be retracted by use of handle (not shown), overcoming the resistance of strong spring 144. In this case, when the actuating tang 142 is retracted, force from the springs 152 (depicted in FIG. 3) bias the locking tangs 146, 148 into their release position, and allow the closure 200 to be opened away from side frame member 330. That is, when the actuating tang 142 (and spring 144) is retracted, the biasing springs 152 retract the locking tangs 146, 148 allowing the door to be opened.

In another embodiment of the second locking apparatus 140, strong spring 144 is positioned laterally (i.e. transversely to the plane of the closure), such that strong spring 144 biases locking tangs 146, 148 outwardly, in the locking position. The second locking apparatus 140 is ordinarily biased into this position by strong spring 144, so that if the closure 200 is in a closed position, the locking tangs 146, 148 locate within respective locking recesses 158 on either side of the channel 360 of side frame member 330. In this position, the locking tangs 146, 148 hold the closure 200 firmly closed.

Figure 15:
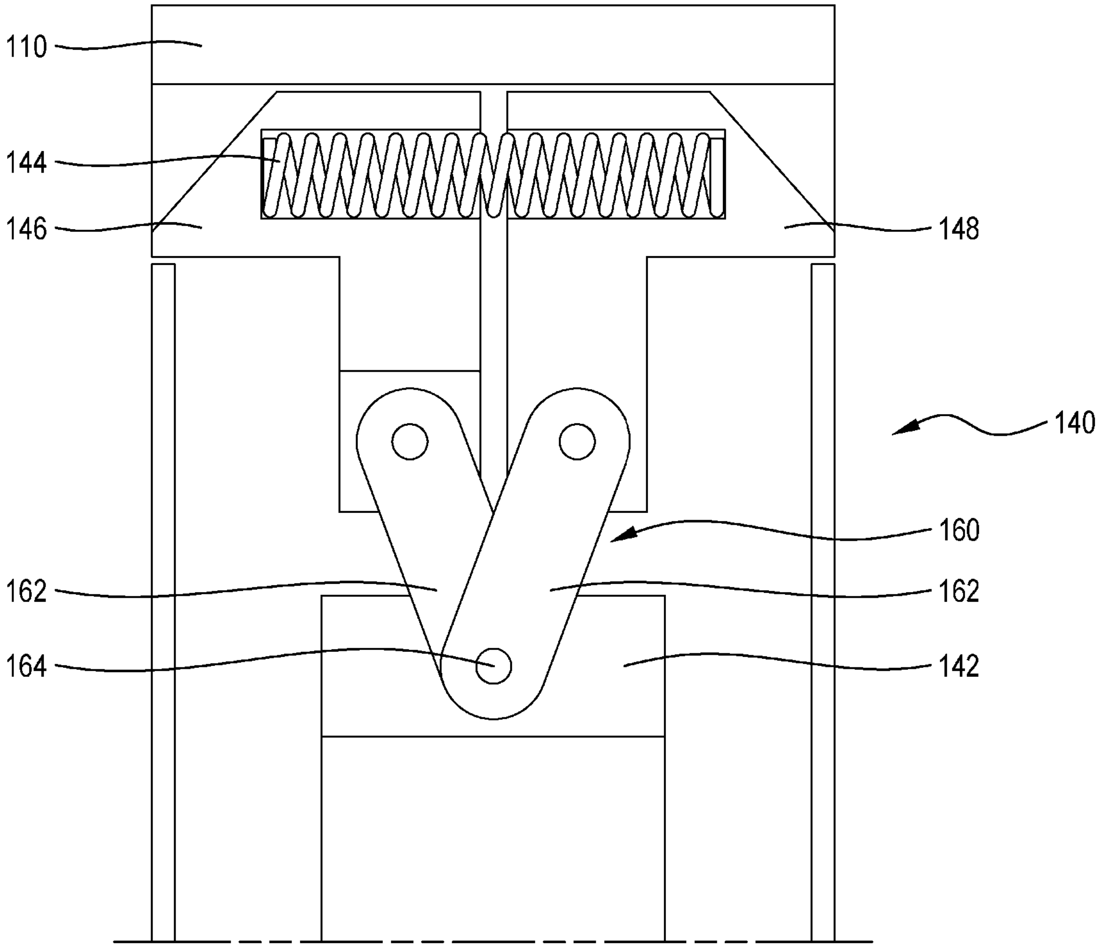
FIG. 15 is a top view of the components of the lock of FIG. 14, in a release position.

A further aspect of this particular embodiment is when actuating tang 142 is retracted by use of a handle (not shown), mechanical linkage 160 may overcome the force of strong spring 144, retracting locking tangs 146, 148 from their extended locking position, to their retracted released position, as seen in FIG. 15, allowing the door to be opened.

In some embodiments, the closure 200 may be locked with the actuating tang 142 in the extended position and the locking tangs 146, 148 engaged within recesses 350, for example by preventing operation of the handle (from either or both sides of the closure 200).

In the multi-lock locking arrangement 100 of the present invention, the different locks 120, 140 may be operated independently, or may release in different ways. For example, operation of the handle (not shown) from one side of the closure 200 may result in release of both the deadlock 120 and the mortice lock 140, while operation of the handle from the other side of the closure 200 may not unlock the deadlock 120. Alternatively, key operation to unlock the deadlock 120 may also unlock the handle, to allow its operation to release the mortice lock; that is, unlocking of the deadlock 120 may also unlock the mortice lock 140. In such embodiments, the key (not shown) for the deadlock 120 is different to the key (not shown) for the mortice lock 140. In alternative embodiments, the key (not shown) for the deadlock 120 is the same to the key (not shown) for the mortice lock 140. Different mechanisms to achieve this functionality may be provided in different embodiments of the invention.

In further embodiments of the multi-lock locking arrangement 100 of the present invention, the different locks 120, 140 may be mechanically linked and operated simultaneously. In such embodiments, the first lock and the second lock are mechanically linked whereby key activation or turn snib activation to unlock the first lock also unlocks the second lock.

As previously described, the first locking apparatus 120 and/or the second locking apparatus 140 may also be electronically controlled. In such cases, the locked or unlocked status of locking apparatus 100 (or individually the first lock 120 and/or second lock 120) may be communicated using a signalling means. In one embodiment, a locked/unlocked status may be visually communicated with indicia, for example, by displaying a certain word, phrase and/or colour to signify the locked/unlocked status. In certain embodiments, the indicia may be located in the lock box housing and visible through an aperture or window located on the housing. In one embodiment, the word "locked" may be used to indicate the locked status, and the word "unlocked" may be used to indicate the unlocked status. In another embodiment, the colour red may be used to indicate the locked status, and a different colour, such as the colour green, may be used to indicate the unlocked status.

In another embodiment, as shown in FIGS. 16 and 17 the locked/unlocked status of the lock box may be electronically communicated, for example, by utilising a sensor such as an electronic signaller, such as a micro switch 170 or a printed circuit board (PCB) (not shown in FIGS. 16 and 17), to electronically signal the locked or unlocked status of the lock box. The signalling means may be located in or on the lock box housing and suitably positioned therein or thereon such that the signalling means toggles between two states, corresponding to its on and off states, in response to movement of the locking tangs 124, 126, 146, 148 or actuating tangs 122, 142. In a certain embodiment, shown in FIGS. 16 and 17, the micro switch may comprise a lever 172 which may be pushed to its "on" or "locked" position via interaction with locking tang 124 extending to the locking position, as shown in FIG. 17, or pushed to its "off" or "unlocked" position via interaction with locking tang 124 being retracted to its release position, as shown in FIG. 16. This has particular application to the deadlock embodiment 120.

In a further embodiment, the micro switch 170 or PCB may be connected via a continuous cable to a guardhouse or offsite location such as a security company. The micro switch could be capable of sending a signal to the guardhouse or offsite location to indicate to said location the locked/unlocked status of the lock box. The micro switch or PCB could further be capable of sounding an alarm at said location if the status of the lock box changes from locked to unlocked position or vice versa.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. Locking apparatus for a sliding closure slidable within a frame defining a closure plane, the locking apparatus comprising:

at least one locking tang movable transversely to the closure plane, between:

a locking position where the at least one locking tang extends laterally to the side of the sliding closure, in a direction transverse to the closure plane, beyond the closure to be received within a corresponding locking recess in the frame, such that the at least one locking tang resists opening of the closure; and a release position where the at least one locking tang is withdrawn within the dimensions of the frame, such that the closure may be opened or closed; and an actuating tang which is extendible longitudinally from the closure in a direction of sliding of the sliding closure, to move the at least one locking tang into its locking position, wherein the actuating tang includes a terminal end, wherein the at least one locking tang comprises a cam surface whereby extension of the actuating tang causes the terminal end to contiguously contact, and push on, the cam surface of the respective at least one locking tang resulting in translation of the extension of the actuating tang into lateral movement of the at least one locking tang to the locking position.

2. The locking apparatus of claim 1, comprising two locking tangs which extend laterally on opposite sides of the closure when in their respective locking positions, to be received within corresponding recesses in opposite sides of the frame.

3. The locking apparatus of claim 1, wherein the terminal end comprises at least one cam surface oblique to the direction of extension of the actuating tang.

4. The locking apparatus of claim 1, wherein the at least one locking tang is biased to the release position by a spring.

5. The locking apparatus of claim 1, wherein the at least one locking tang is biased to the release position by a mechanical linkage.

6. The locking apparatus of claim 1, wherein the locking apparatus is a deadlock, and the actuating tang is movable by one or more of: operation of a key or a turn snib, and spring force.

7. The locking apparatus of claim 1, wherein the locking apparatus is a mortice lock and:

the actuating tang is biased outwardly from the closure to an extended position, to thereby bias the at least one locking tang to the locking position; and the at least one locking tang comprises an external cam surface, such that when the closure is slid to a closed position, the external cam surface engages with the frame to push the at least one locking tang to its release position, until it reaches the recess within the frame and is biased back to the locking position.

8. The locking apparatus of claim 7, wherein the actuating tang is lockable in the extended position.

9. The locking apparatus of claim 8, wherein the actuating tang is locked by a key in the extended position.

10. Locking apparatus for a sliding closure slidable within a frame defining a closure plane, the locking apparatus comprising:

a deadlock including:

at least one locking tang movable transversely to the closure plane, between:

a locking position where the at least one locking tang extends laterally, in a direction transverse to the closure plane, beyond the closure to be received within a corresponding locking recess in the frame, such that the at least one locking tang resists opening of the closure; and a release position where the at least one locking tang is withdrawn within the dimensions of the frame, such that the closure may be opened or closed wherein the at least one locking tang is biased to the release position; and an actuating tang which is extendible longitudinally from the closure, to move the at least one locking tang into its locking position, wherein the at least one locking tang comprises a cam surface whereby extension of the actuating tang pushes on the cam surface of the respective at least one locking tang and causes the actuating tang to matingly engage with the cam surface of the at least one locking tang to move the at least one locking tang laterally, and wherein the actuating tang is movable by one or more of: operation of a key or a turn snib, and spring force; and a mortice lock including:

at least one mortice locking tang movable transversely to the closure plane, between:

a locking position where the at least one mortice locking tang extends laterally, in a direction transverse to the closure plane, beyond the closure to be received within a corresponding locking recess in the frame, such that the at least one mortice locking tang resists opening of the closure; and a release position where the at least one mortice locking tang is withdrawn within the dimensions of the frame, such that the closure may be opened or closed wherein the at least one locking tang is biased to the release position; and a mortice actuating tang which is extendible longitudinally from the closure, to move the at least one mortice locking tang into its locking position, wherein the at least one mortice locking tang comprises a cam surface whereby extension of the mortice actuating tang pushes on the cam surface of the respective at least one mortice locking tang and causes the mortice actuating tang to matingly engage with the cam surface of the at least one mortice locking tang to move the at least one mortice locking tang laterally, and wherein the mortice actuating tang is biased outwardly from the closure to an extended position, to thereby bias the at least one mortice locking tang to the locking position, and wherein the at least one mortice locking tang comprises an external cam surface, such that when the closure is slid to a closed position, the external cam surface engages with the frame to push the at least one mortice locking tang to its release position, until it reaches the recess within the frame and is biased back to the locking position.

11. The locking apparatus of claim 10, wherein key activation or turn snib activation to unlock the deadlock is independent from key activation to unlock the mortice lock.

12. The locking apparatus of claim 10, wherein key activation to unlock the deadlock is mechanically linked to key activation of the mortice lock whereby key activation to unlock the deadlock also unlocks the mortice lock.

13. The locking apparatus of claim 1, further comprising a sensor.

14. The locking apparatus of claim 13, wherein the sensor is operatively connected to send a signal when the at least one locking tang is in the locking position or the release position.

15. The locking apparatus of claim 13, wherein the sensor is configured to trigger an alarm when the at least one locking tang is disengaged from the locking position or the release position.

16. The locking apparatus of claim 1, wherein the closure is a door.

17. A closure assembly comprising:

a frame defining an opening and defining a closure plane;

a closure slidable within the frame to open or close the opening; and one or more locking apparatus of claim 1.

18. The locking apparatus of claim 11, wherein the key for the deadlock is different to the key for the mortice lock.

19. The locking apparatus of claim 13, wherein the sensor is configured to detect when the at least one locking tang is in the locking position or the release position.

20. The locking apparatus of claim 1, wherein the extension of the actuating tang causes the terminal end to contiguously contact, and push on, the cam surface of the respective at least one locking tang at a location axially aligned with the corresponding locking recess as viewed along an axis normal to the closure plane.

* * * * *